United States Patent
Wang

(10) Patent No.: US 12,170,652 B2
(45) Date of Patent: Dec. 17, 2024

(54) PACKET TRANSMISSION METHOD AND APPARATUS AND COMPUTER STORAGE MEDIUM

(71) Applicant: HUAWEI TECHNOLOGIES CO., LTD., Shenzhen (CN)

(72) Inventor: Chunning Wang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 409 days.

(21) Appl. No.: 17/672,359

(22) Filed: Feb. 15, 2022

(65) Prior Publication Data

US 2022/0174051 A1 Jun. 2, 2022

Related U.S. Application Data

(63) Continuation of application No. PCT/CN2020/112165, filed on Aug. 28, 2020.

(30) Foreign Application Priority Data

Aug. 29, 2019 (CN) .......................... 201910810004.9

(51) Int. Cl.
*H04L 9/40* (2022.01)
*H04L 69/22* (2022.01)

(52) U.S. Cl.
CPC ...... *H04L 63/0435* (2013.01); *H04L 63/0485* (2013.01); *H04L 63/20* (2013.01); *H04L 69/22* (2013.01)

(58) Field of Classification Search
CPC .. H04L 63/0435; H04L 63/0485; H04L 63/20
(Continued)

(56) References Cited

U.S. PATENT DOCUMENTS

| 6,055,236 A | 4/2000 | Nessett et al. |
| 2006/0193320 A1 | 8/2006 | Shin et al. |

(Continued)

FOREIGN PATENT DOCUMENTS

| CN | 1540916 A | 10/2004 |
| CN | 101217494 A | 7/2008 |

(Continued)

OTHER PUBLICATIONS

S. Kent, "IP Encapsulating Security Payload (ESP)", Request for Comments: 4303, Network Working Group, 44 Pages.

*Primary Examiner* — Anthony D Brown
(74) *Attorney, Agent, or Firm* — Maier & Maier, PLLC

(57) ABSTRACT

A packet transmission method and apparatus, and a computer storage medium, and relates to the field of communications technologies. A first device obtains service type information of an original packet. The first device generates an encapsulating security payload (ESP) packet of the original packet based on a target security association, where the ESP packet includes a packet header, an ESP header, a service type field, a first encrypted part, and an ESP authentication data field, and the service type field includes the service type information. The first device sends the ESP packet to a second device. The second device parses the service type field to obtain the service type information of the original packet. The second device performs a target operation on the ESP packet based on a service policy and the service type information of the original packet.

20 Claims, 5 Drawing Sheets

(58) Field of Classification Search
USPC .......................................................... 713/153
See application file for complete search history.

(56) References Cited

U.S. PATENT DOCUMENTS

| | | |
|---|---|---|
| 2009/0073971 A1 | 3/2009 | Taaghol |
| 2010/0235619 A1 | 9/2010 | Inoue |
| 2013/0094360 A1* | 4/2013 | Luft ...................... H04L 43/028 |
| | | 370/235 |
| 2013/0103940 A1 | 4/2013 | Badea |
| 2014/0201523 A1 | 7/2014 | Sato |
| 2019/0020684 A1* | 1/2019 | Qian ...................... H04L 63/205 |

FOREIGN PATENT DOCUMENTS

| | | |
|---|---|---|
| CN | 102158977 A | 8/2011 |
| CN | 102413176 A | 4/2012 |
| CN | 103475598 A | 12/2013 |
| CN | 104168553 A | 11/2014 |
| CN | 108200071 A | 6/2018 |
| JP | 2012010254 A | 1/2012 |
| WO | 2017193732 A1 | 11/2017 |

* cited by examiner

PACKET TRANSMISSION METHOD AND APPARATUS AND COMPUTER STORAGE MEDIUM

CROSS-REFERENCE TO RELATED APPLICATIONS

This application is a continuation of International Application No. PCT/CN2020/112165, filed on Aug. 28, 2020, which claims priority to Chinese Patent Application No. 201910810004.9, filed on Aug. 29, 2019. The disclosures of the aforementioned applications are hereby incorporated by reference in their entireties.

FIELD

The embodiments relate to the field of communications technologies, and in particular, to a packet transmission method and apparatus, and a computer storage medium.

BACKGROUND

Internet Protocol Security (IPSec) is a set of open network security protocols formulated by Internet Engineering Task Force (IETF). IPSec is not a single protocol, but a collection of protocols and services that provide security for an Internet Protocol (IP) network. IPSec uses the Authentication Header (AH) protocol and the Encapsulating Security Payload (ESP) protocol to protect IP packets. The ESP protocol mainly implements functions of encryption, data integrity verification, and packet replay prevention.

An ESP packet obtained after an original packet is encapsulated based on the ESP protocol includes a packet header, an ESP header, an encrypted part, and an ESP authentication data field. The encrypted part includes a payload data field and an ESP trailer. The payload data field is used to carry content of the original packet. The ESP trailer includes a next header. The next header is used to indicate a payload type of the payload data field. The payload type includes Transmission Control Protocol (TCP), User Datagram Protocol (UDP), or Internet Control Message Protocol (ICMP). That is, the next header is used to indicate that the original packet is a TCP packet, a UDP packet, or an ICMP packet.

Currently, when a device needs to determine a service type of a received ESP packet, the device first decrypts an encrypted part of the ESP packet, determines a payload type of a payload data field based on a next header in an ESP trailer, parses the payload data field based on the payload type to obtain service information carried in the payload data field, and further determines a service type of an original packet.

However, in a process of determining the service type of the original packet, the device needs to decrypt the encrypted part of the ESP packet as a whole. This requires a heavy decryption calculation workload, which results in high calculation overheads of the device.

SUMMARY

The embodiments provide a packet transmission method and apparatus, and a computer storage medium, to resolve a problem that calculation overheads currently are high in a process of determining a service type of an original packet by a device.

According to a first aspect, a packet transmission method is provided, and is applied to a communications network. The communications network includes a first device and a second device, a target security association is established between the first device and the second device, the first device is an initiator of the target security association, and the second device is a destination of the target security association. The method includes:

The first device obtains service type information of an original packet. The first device generates an ESP packet of the original packet based on the target security association, where the ESP packet includes a packet header, an ESP header, a service type field, a first encrypted part, and an ESP authentication data field, the service type field includes the service type information, the first encrypted part includes a data part of the original packet, and the service type field is used to enable the second device to determine, based on the service type information, processing of the ESP packet. The first device sends the ESP packet to the second device.

Because the ESP packet generated by the first device includes the service type field, and the service type field is used to enable the second device to determine, based on the service type information, processing of the ESP packet, the second device may obtain the service type information of the original packet by parsing the service type field of the ESP packet, and a next operation on the ESP packet is determined without decrypting the first encrypted part. This may reduce a decryption calculation workload in a process of determining a service type of the original packet by the second device, and further reduce calculation overheads of the second device.

Optionally, the ESP packet further includes a block identifier field. The block identifier field is located between the packet header and the ESP header, and the block identifier field is used to indicate that the ESP packet includes the service type field.

The block identifier field is added between the packet header of the ESP packet and the ESP header, to indicate that the ESP packet has the service type field. When there is no block identifier field between the packet header of the ESP packet and the ESP header, it indicates that the ESP packet has no service type field. In this case, a receiving device may be enabled to process both a conventional ESP packet and the ESP packet provided in embodiments, which ensures compatibility of the device.

Optionally, the block identifier field is further used to indicate to obtain the service type field before decrypting the first encrypted part.

Optionally, configuration of the target security association indicates to obtain the service type field before decrypting the first encrypted part.

Optionally, the service type field is a second encrypted part of the ESP packet. The service type field in the ESP packet may either not be encrypted. This is not limited in the embodiments.

Optionally, the service type information includes one or more of precedence of the original packet, an identifier of an application program to which the original packet belongs, an identifier of an enterprise that sends the original packet, an identifier of a department that sends the original packet, and an identifier of a user that sends the original packet.

According to a second aspect, a packet transmission method is provided, and is applied to a communications network. The communications network includes a first device and a second device, a target security association is established between the first device and the second device, the first device is an initiator of the target security association, and the second device is a destination of the target security association. The method includes:

The second device receives an ESP packet sent by the first device, where the ESP packet includes a packet header, an ESP header, a service type field, a first encrypted part, and an ESP authentication data field, the first encrypted part includes a data part of an original packet, and the service type field includes service type information of the original packet. The second device parses the service type field to obtain the service type information of the original packet. The second device performs a target operation on the ESP packet based on a service policy and the service type information of the original packet.

Because the ESP packet includes the service type field, the second device may obtain the service type information of the original packet by parsing the service type field of the ESP packet, and further performs the target operation on the ESP packet based on the service policy and the service type information of the original packet. The first encrypted part does not need to be decrypted, which reduces a decryption calculation workload in a process where the second device determines a service type of the original packet, and further reduces calculation overheads of the second device.

Optionally, the target operation includes any one of the following: decrypting the first encrypted part of the ESP packet, discarding the ESP packet, buffering the ESP packet, and forwarding the ESP packet.

Optionally, the ESP packet further includes a block identifier field. The block identifier field is located between the packet header and the ESP header, and the block identifier field is used to indicate that the ESP packet includes the service type field.

Optionally, the block identifier field is further used to indicate to obtain the service type field before decrypting the first encrypted part.

Optionally, configuration of the target security association indicates to obtain the service type field before decrypting the first encrypted part.

Optionally, the service type field is a second encrypted part of the ESP packet. Before the second device parses the service type field, the second device decrypts the service type field based on an encryption algorithm configured in the target security association.

According to a third aspect, a packet transmission apparatus is provided. The apparatus includes a plurality of function modules, and the plurality of function modules interact with each other to implement the method in the first aspect and the implementations of the first aspect. The plurality of function modules may be implemented based on software, hardware, or a combination of software and hardware, and the plurality of function modules may be randomly combined or divided.

According to a fourth aspect, a packet transmission apparatus is provided. The apparatus includes a plurality of function modules, and the plurality of function modules interact with each other to implement the method in the second aspect and the implementations of the second aspect. The plurality of function modules may be implemented based on software, hardware, or a combination of software and hardware, and the plurality of function modules may be randomly combined or divided.

According to a fifth aspect, a packet transmission apparatus is provided, where the apparatus includes a processor and a memory.

The memory is configured to store a computer program, where the computer program includes program instructions.

The processor is configured to invoke the computer program to implement the packet transmission method according to any one of the implementations of the first aspect.

According to a sixth aspect, a packet transmission apparatus is provided, where the apparatus includes a processor and a memory.

The memory is configured to store a computer program, where the computer program includes program instructions.

The processor is configured to invoke the computer program to implement the packet transmission method according to any one of the implementations of the second aspect.

According to a seventh aspect, a computer storage medium is provided. The computer storage medium stores program instructions, and when the program instructions are executed, the packet transmission method according to any one of the implementations of the first or second aspect is implemented.

According to an eighth aspect, a communications network is provided. The communications network includes a first device and a second device. A target security association is established between the first device and the second device. The first device is an initiator of the target security association, and the second device is a destination of the target security association. The first device includes the packet transmission apparatus according to the third aspect, and the second device includes the packet transmission apparatus according to the fourth aspect.

Beneficial effects brought by the solutions include at least the following.

In the packet transmission method, because the ESP packet generated by the first device includes the service type field, and the service type field is used to enable the second device to determine, based on the service type information, the processing of the ESP packet, the second device may obtain the service type information of the original packet by parsing the service type field of the ESP packet. Therefore, the target operation is further performed on the ESP packet based on the service policy and the service type information of the original packet without decrypting the first encrypted part. This may reduce the decryption calculation workload in the process of determining the service type of the original packet by the second device, and further reduce the calculation overheads of the second device.

DETAILED DESCRIPTION OF THE EMBODIMENTS

To make the objectives, solutions, and advantages clearer, the following further describes the implementations in detail with reference to the accompanying drawings.

A prerequisite for secure IPSec data transmission is that a security association (SA) is successfully established between peers (these two endpoints may be running IPSec). The peers agree on a plurality of elements through the security association, including a security protocol used between the peers, a packet encapsulation mode, an encryption algorithm, an authentication algorithm, a key exchange mode between the peers, an Internet Key Exchange (IKE) protocol used between the peers, a security association lifetime, and the like. Optionally, the security association between the peers may be established through manual configuration, or the security association between the peers may be established through IKE auto-negotiation.

The security association is a unidirectional logical connection. The peers between which the security association is established include an initiator and a destination. A protection mode for data sent from the initiator to the destination is defined in the security association. The security association is uniquely identified by a triplet, and the triplet includes a security parameters index (SPI), an IP address of the destination, and the used security protocol.

The security protocol is used to provide security services such as encryption and/or authentication. The security protocol includes an AH protocol and an ESP protocol, both the security protocols are IP-based transport layer protocols. A working principle of the ESP protocol is to add an ESP header before a data part of an original packet, add an ESP trailer and an ESP authentication data field after the data part of the original packet, encrypt the data part of the original packet, and finally perform encapsulation to obtain the ESP packet. The data part of the original packet is a payload part of the original packet and includes a transport layer protocol header and a data field.

Figure 1:
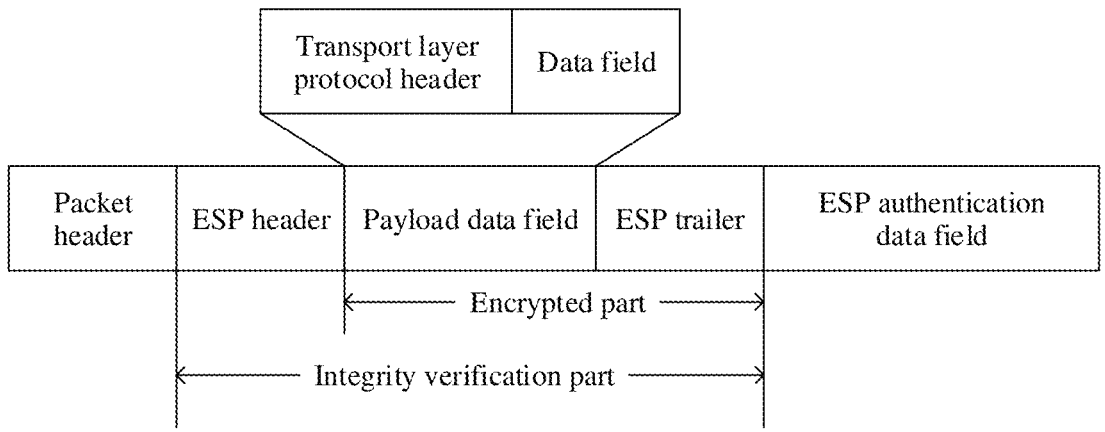
FIG. 1 is a schematic diagram of a structure of an ESP packet obtained currently by encapsulation in a transport mode.
Figure 2:
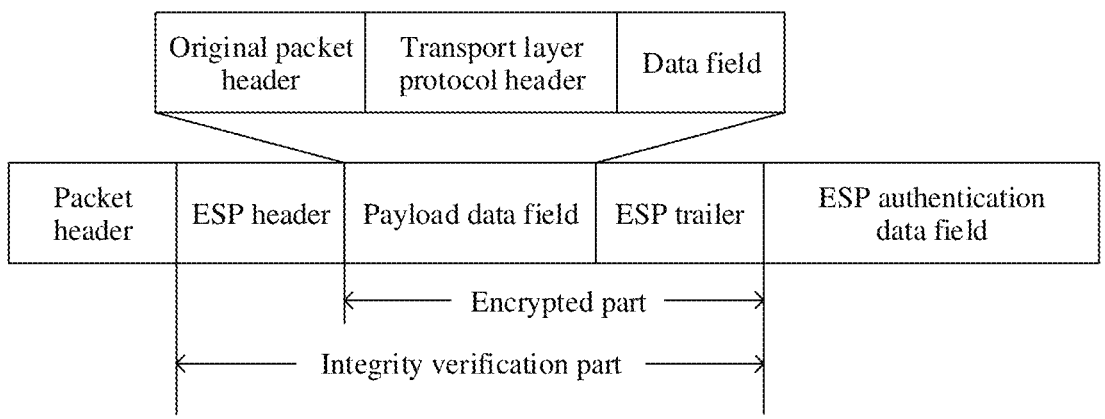
FIG. 2 is a schematic diagram of a structure of an ESP packet obtained currently by encapsulation in a tunnel mode.

The packet encapsulation mode includes a transport mode and a tunnel mode. In some embodiments, structures of the ESP packet in the transport mode and the tunnel mode are separately described. FIG. 1 is a schematic diagram of a structure of an ESP packet obtained currently by encapsulation in a transport mode. FIG. 2 is a schematic diagram of a structure of an ESP packet obtained currently by encapsulation in a tunnel mode. As shown in FIG. 1 and FIG. 2, the ESP packets include a packet header, an ESP header, a payload data field, an ESP trailer, and an ESP authentication data field. The payload data field is used to carry content of an original packet. As shown in FIG. 1, in the transport mode, the payload data field includes a data part of the original packet. As shown in FIG. 2, in the tunnel mode, the payload data field includes a packet header of the original packet (original packet header for short) and the data part of the original packet. Refer to FIG. 1 and FIG. 2. The data part of the original packet may include a transport layer protocol header and a data field. A transport layer protocol defined in the packet header is an ESP protocol. An integrity verification part of the ESP packet includes the ESP header, the payload data field, and the ESP trailer. An encrypted part of the ESP packet includes the payload data field and the ESP trailer.

In the ESP packets shown in FIG. 1 and FIG. 2, the ESP header includes an SPI field and a sequence number. The SPI field is used to carry an SPI, and the SPI is used to uniquely identify a security association. The sequence number is used to uniquely identify a packet to prevent a packet replay attack. The ESP trailer includes a padding field (optional), a pad length field, and a next header. The pad length field is used to indicate a length of the padding field. The next header is used to indicate a payload type of the payload data field, and the next header carries an identifier of a next field of the ESP header. In the transport mode, the next header carries the number of a transport layer protocol (TCP protocol, UDP protocol, or ICMP protocol). In the tunnel mode, the next header carries the number of an IP protocol of the original packet. A device determines, by parsing the original packet header, a transport layer protocol used by the original packet. A length of the SPI field is 32 bits. A length of the sequence number is 32 bits. The payload data field is a variable-length field. A length of the padding field ranges from 0 to 255 bytes. A length of the pad length field is 8 bytes. A length of the next header is 8 bits. The ESP authentication data field is a variable-length field and has a length that is an integer multiple of 32 bits, and generally 96 bits.

When the device receives the ESP packet shown in FIG. 1 or FIG. 2, and then needs to determine a service type of the original packet, because service information of the original packet is carried in the payload data field, the device needs to parse the payload data field to obtain the service information to determine the service type of the original packet. Therefore, the device needs to decrypt the encrypted part of the ESP packet as a whole, determine the payload type of the payload data field based on the next header in the ESP trailer, and parse the payload data field based on the payload type. A calculation workload of the device to decrypt the encrypted part of the ESP packet as a whole is high. As a result, calculation overheads of the device are high.

For example, in a scenario of inbound rate limiting on the device, if an actual packet receiving rate of the device is greater than a maximum packet receiving rate of the device, the device needs to determine importance of the ESP packet based on the service type of the original packet, and discard an ESP packet of relatively low importance, to ensure that an ESP packet of high importance is preferentially transmitted. For example, precedence of a signaling packet is higher than precedence of a multimedia service packet. In this case, the device may discard the multimedia service packet to ensure preferential transmission of the signaling packet. However, for an ESP packet that needs to be discarded, the device also needs to decrypt an encrypted part of the ESP packet as a whole, which consumes a large amount of calculation capability of the device and wastes device performance.

Figure 3:
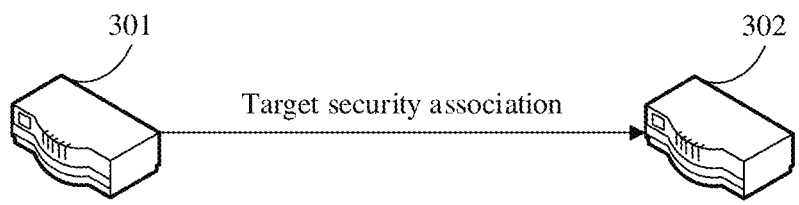
FIG. 3 is a schematic diagram of a structure of a communications network according to an embodiment.

FIG. 3 is a schematic diagram of a structure of a communications network according to an embodiment. As shown in FIG. 3, the communications network includes a first device 301 and a second device 302. A target SA is established between the first device 301 and the second device 302. The first device 301 is an initiator of the target SA, and the second device 302 is a destination of the target SA. A security protocol configured in the target SA is an ESP protocol. The target SA may specify that a packet sent by the first device 301 to the second device 302 is protected through ESP protocol encapsulation. In some embodiments, a packet that is protected through the ESP protocol encapsulation is referred to as an ESP packet.

Optionally, the communications network may be a metro network, a wide area network, a campus network, or the like. The wide area network may be a software-defined wide area network (SD-WAN). The first device 301 and the second device 302 may be network devices and may be routers, switches, or the like.

Optionally, the target SA may be established between the first device 301 and the second device 302 through manual configuration, or the target SA may be established between the first device 301 and the second device 302 through IKE auto-negotiation.

Figure 4:
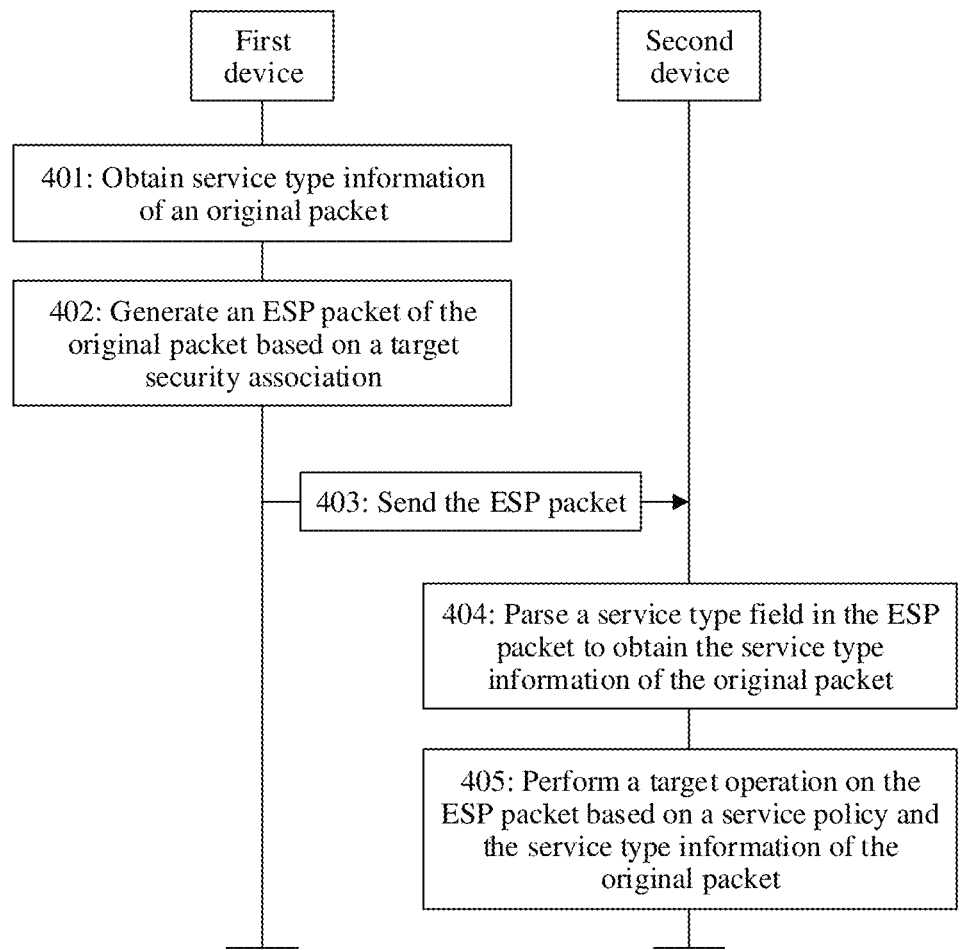
FIG. 4 is a flowchart of a packet transmission method according to an embodiment.

FIG. 4 is a flowchart of a packet transmission method according to an embodiment. The method may be applied to the communications network shown in FIG. 3. As shown in FIG. 4, the method includes the following steps.

S401: A first device 301 obtains service type information of an original packet.

Optionally, the original packet may be a TCP packet, a UDP packet, or an ICMP packet. The service type information of the original packet includes one or more of precedence of the original packet, an identifier of an application program to which the original packet belongs, an identifier of an enterprise that sends the original packet, an identifier of a department that sends the original packet, and an identifier of a user that sends the original packet. The precedence of the original packet may be represented by a differentiated services code point (DSCP) field value in an original packet header. The identifier of the application program to which the original packet belongs may be represented by application identification (APP ID). The identifier of the enterprise that sends the original packet and/or the identifier of the department that sends the original packet may be represented by virtual private network identification (VPN ID). The identifier of the user that sends the original packet may be represented by an IP address of the user.

The service type information of the original packet is usually carried in a data part of the original packet, and the data part of the original packet includes a transport layer protocol header and a data field of the original packet. After receiving the original packet, the first device 301 parses the data part of the original packet, to obtain the service type information of the original packet.

S402: The first device 301 generates an ESP packet of the original packet based on a target security association.

Figure 5:
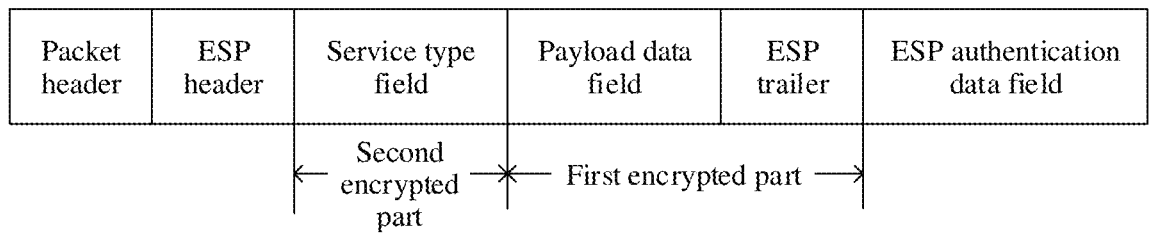
FIG. 5 is a schematic diagram of a structure of an ESP packet according to an embodiment.

Optionally, FIG. 5 is a schematic diagram of a structure of an ESP packet according to an embodiment. As shown in FIG. 5, the ESP packet includes a packet header, an ESP header, a service type field, a first encrypted part, and an ESP authentication data field. The service type field includes service type information of an original packet. The first encrypted part includes a data part of the original packet. The data part of the original packet is carried in a payload data field of the first encrypted part, and the first encrypted part further includes an ESP trailer. The service type field is used to enable a second device 302 to determine, based on the service type information, processing of the ESP packet.

Optionally, after being encoded by using a TLV (type-length-value), the service type information of the original packet may be carried in the service type field of the ESP packet. In some embodiments, the service type field may be divided into a plurality of subfields, and each subfield is used as a basic information element (IE), to carry fixed service type information. For example, the service type field may be divided into a precedence subfield, an application identification subfield, an enterprise identifier subfield, a department identifier subfield, and a user identifier subfield. The precedence subfield carries the DSCP field value, the application identification subfield carries an APP ID, the enterprise identifier subfield carries a VPN ID, the department identifier subfield carries a VPN ID, and the user identifier subfield carries an IP address.

Figure 6:
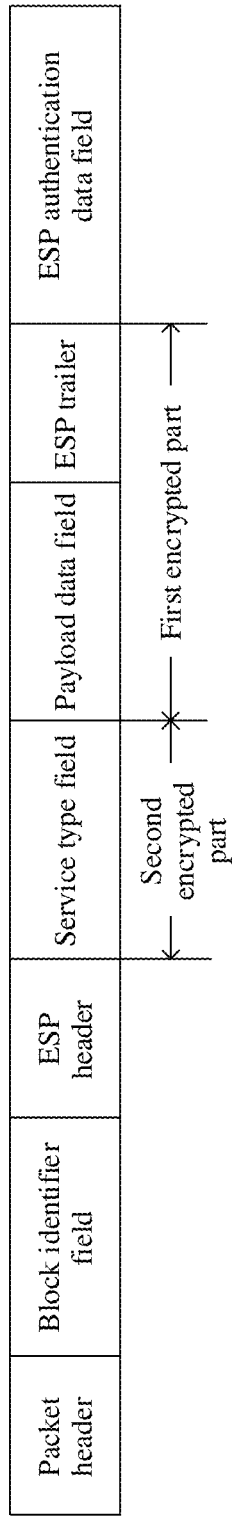
FIG. 6 is a schematic diagram of a structure of another ESP packet according to an embodiment.

Optionally, FIG. 6 is a schematic diagram of a structure of another ESP packet according to an embodiment. As shown in FIG. 6, based on the ESP packet shown in FIG. 5, the ESP packet further includes a block identifier field. Optionally, the block identifier field is located between a packet header and an ESP header, and the block identifier field is used to indicate that the ESP packet includes a service type field.

In some embodiments, a value from 0 to 255 may be used as a block identifier to be filled in the block identifier field. For example, a value 100 may be used as the block identifier to be filled in the block identifier field. A value may be agreed on to be the block identifier in a target security association. An SPI in the ESP header uses a value not from 0 to 255. When a value from 0 to 255 is used as a block identifier, after receiving the ESP packet, a receiving device (a second device 302 in this embodiment) may distinguish whether a field after the packet header is a block identifier field or an SPI field based on a field value after the packet header. The block identifier may also be represented by another identifier, for example, a letter or a character string. This is not limited in the embodiments.

Optionally, when the ESP packet shown in FIG. 6 is used, the configuration may be negotiated in the target security association. If there is a block identifier field between the packet header and the ESP header of the ESP packet, the receiving device 302 parses the service type field to determine a service type of the ESP packet. If there is no block identifier field between the packet header and the ESP header of the ESP packet, the receiving device 302 determines the service type of the ESP packet in a conventional manner, that is, after decrypting an encrypted part as a whole, the receiving device 302 parses the payload data field to determine the service type of the ESP packet.

In some embodiments, the block identifier field is added between the packet header of the ESP packet and the ESP header, to indicate that the ESP packet has the service type field. When there is no block identifier field between the packet header of the ESP packet and the ESP header, it indicates that the ESP packet has no service type field. The receiving device 302 may be enabled to process a conventional ESP packet and the ESP packet provided in some embodiments, which ensures compatibility.

Optionally, the service type field is usually after the ESP header. For example, refer to FIG. 5 and FIG. 6. The service type field is located between the ESP header and the first encrypted part. The service type field may alternatively be located between the first encrypted part and the ESP authentication data field. A location of the service type field in the ESP packet is not limited in some embodiments. A length of the service type field and the location of the service type field in the ESP packet may be configured in the target security association. The service type field may be a field of a fixed length. For example, the length of the service type field may be 4 bytes. Alternatively, the service type field may be a variable-length field.

Optionally, refer to FIG. 5 and FIG. 6. The service type field may be a second encrypted part of the ESP packet. Both the first encrypted part and the second encrypted part in the ESP packet are encrypted through an encryption algorithm configured in the target security association. The encryption algorithm configured in the target security association may be a symmetric encryption algorithm, including a data encryption standard (DES) algorithm, a triple data encryption standard (3DES) algorithm, and an advanced encryption standard (AES) algorithm, or a Chinese cryptographic algorithm (SM1). The service type field in the ESP packet may not be encrypted. This is not limited in the embodiments.

Optionally, the configuration of the target security association may indicate to obtain the service type field before decrypting the first encrypted part. Alternatively, in the ESP packet shown in FIG. 6, the block identifier field may be further used to indicate to obtain the service type field before decrypting the first encrypted part. If the service type field is the second encrypted part of the ESP packet, that is, the service type field is an encrypted field, in this case, obtaining the service type field before decrypting the first encrypted part includes: decrypting the second encrypted part before decrypting the first encrypted part, to obtain the service type field.

Optionally, in the ESP packets shown in FIG. 5 and FIG. 6, when an encapsulation mode configured in the target security association is a transport mode, the payload data field includes the data part of the original packet. When the encapsulation mode configured in the target security association is a tunnel mode, the payload data field includes the original packet header and the data part of the original packet. The data part of the original packet includes the transport layer protocol header and the data field. For explanations and functions of fields other than the service type field and the block identifier field in the ESP packet provided in some embodiments, refer to related explanations and descriptions in IPSec. Details are not described herein in some embodiments. In addition, in the ESP packets shown in FIG. 5 and FIG. 6, an integrity verification part may include the ESP header, the service type field, the payload data field, and the ESP trailer.

S403: The first device 301 sends the ESP packet to a second device 302.

S404: The second device 302 parses a service type field in the ESP packet to obtain the service type information of the original packet.

Optionally, when the target security association specifies that the first device 301 sends the ESP packet shown in FIG. 5 to the second device 302, after receiving the ESP packet sent by the first device 301, the second device 302 directly parses the service type field of the ESP packet based on the location and the length of the service type field that are configured in the target security association, to obtain the service type information of the original packet. When the target security association specifies that the first device 301 may send the conventional ESP packet (the ESP packet shown in FIG. 1 or FIG. 2) and the ESP packet shown in FIG. 6 to the second device 302, after the second device 302 receives the ESP packets sent by the first device 301, the second device 302 first detects whether the field after the packet header is a block identifier field. After determining that the field after the packet header is a block identifier field, the second device 302 parses the service type field of the ESP packet based on the location and the length of the service type field that are configured in the target security association, to obtain the service type information of the original packet; or after determining that the field after the packet header is not a block identifier field, the second device 302 determines the service type of the original packet in the conventional manner, the second device 302 decrypts the encrypted part of the ESP packet as a whole, and parses the payload data field to obtain the service type information of the original packet.

Optionally, when the service type field is the second encrypted part of the ESP packet, before S404 is performed, the second device 302 decrypts the service type field based on the encryption algorithm configured in the target security association.

In some embodiments, because the ESP packet includes the service type field, the second device 302 may obtain the service type information of the original packet by parsing the service type field of the ESP packet, to determine a next operation on the ESP packet without decrypting the first encrypted part. In some application scenarios, the second device 302 may also decrypt the first encrypted part of the ESP packet while parsing the service type field in the ESP packet, or the second device 302 may also decrypt the first encrypted part of the ESP packet before parsing the service type field in the ESP packet.

S405: The second device 302 performs a target operation on the ESP packet based on a service policy and the service type information of the original packet.

Optionally, the target operation includes any one of the following: decrypting the first encrypted part of the ESP packet, discarding the ESP packet, forwarding (or bypassing) the ESP packet, buffering the ESP packet, decapsulating the ESP packet to obtain the original packet.

Optionally, the configuration of the target security association or the block identifier field is used to indicate the second device 302 to parse the service type field in the ESP packet, to obtain the service type information of the original packet before decrypting the first encrypted part of the ESP packet. In this way, if the ESP packet is determined, by parsing the service type field, to be discarded or forwarded, a waste of calculation used to decrypt the first encrypted part by the second device 302 can be avoided, which reduces calculation overheads of the second device 302.

In a scenario of inbound rate limiting, an implementation process of S405 may include: When an actual packet receiving rate of the second device 302 is greater than a maximum packet receiving rate of the second device 302, the second device 302 discards an ESP packet of low precedence, and buffers ESP packets of medium precedence and high precedence. When a dedicated decryption device is specified in the service policy configured on the second device 302 to uninstall encryption and decryption functions on the ESP packet, the second device 302 may forward the received ESP packet to the dedicated decryption device. When the service type field of the ESP packet carries the precedence of the original packet, the second device 302 may directly determine precedence of the ESP packet after parsing the service type field. When the service type field of the ESP packet does not carry the precedence of the original packet, after parsing the service type field, the second device 302 may determine the precedence of the ESP packet based on one or more of the application program to which the original packet belongs, the enterprise that sends the original packet, the department that sends the original packet, and the user that sends the original packet.

For example, assume that the service policy is defined as follows: total interface bandwidth of the second device 302 is 100 Mbps (megabits per second), interface bandwidth allocated to a department A is 40 Mbps, and interface bandwidth allocated to a department B is 60 Mbps. In the interface bandwidth of the department A, interface bandwidth allocated to a voice application is 20 Mbps, interface bandwidth allocated to an email application is 10 Mbps, and interface bandwidth allocated to an Internet access application is 10 Mbps. The voice application is a high-precedence application, the email application is a medium-precedence application, and the Internet access application is a low-precedence application. When an interface of the second device 302 receives 100 Mbps traffic of the department A and 100 Mbps traffic of the department B, 40 Mbps traffic of the department A passes through the second device 302 (60 Mbps traffic of the department A discarded), and 60 Mbps traffic of the department B passes through the second device 302 (40 Mbps traffic of the department B discarded). For the traffic of the department A, if traffic of the voice application exceeds 20 Mbps or traffic of the email application exceeds 10 Mbps, the second device 302 buffers an excess of packets, and when subsequent traffic decreases, sends the buffered packets, and implements a peak cut by buffering the packets. If traffic of the Internet access application exceeds 10 Mbps, the second device 302 directly discards the excess of packets.

A sequence of steps in the packet transmission method provided in the embodiments may be properly adjusted. A step may be correspondingly added or removed based on a situation. Any method that can be readily figured out by a person skilled in the art shall fall within the protection scope. Therefore, details are not described again.

In conclusion, in the packet transmission method provided in some embodiments, because the ESP packet includes the service type field, the second device 302 may obtain the service type information of the original packet by parsing the service type field of the ESP packet, and further performs the target operation on the ESP packet based on the service policy and the service type information of the original packet. The first encrypted part does not need to be decrypted, which reduces a decryption calculation workload in a process where the second device 302 determines the service type of the original packet, and further reduces the calculation overheads of the second device 302.

Figure 7:
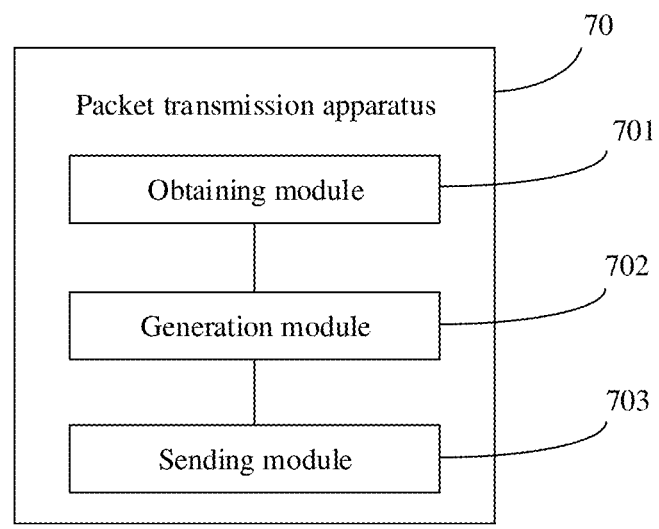
FIG. 7 is a schematic diagram of a structure of a packet transmission apparatus according to an embodiment.

FIG. 7 is a schematic diagram of a structure of a packet transmission apparatus according to an embodiment. The apparatus may be applied to the first device 301 in the communications network shown in FIG. 3. As shown in FIG. 7, the apparatus 70 includes:
- an obtaining module 701, configured to obtain service type information of an original packet;
- a generation module 702, configured to generate an ESP packet of the original packet based on a target security association, where the ESP packet includes a packet header, an ESP header, a service type field, a first encrypted part, and an ESP authentication data field, the service type field includes the service type information, the first encrypted part includes a data part of the original packet, and the service type field is used to enable a second device 302 to determine, based on the service type information, processing of the ESP packet; and
- a sending module 703, configured to send the ESP packet to the second device 302.

Optionally, the ESP packet further includes a block identifier field. The block identifier field is located between the packet header and the ESP header, and the block identifier field is used to indicate that the ESP packet includes the service type field.

Optionally, the block identifier field is further used to indicate to obtain the service type field before decrypting the first encrypted part.

Optionally, configuration of the target security association indicates to obtain the service type field before decrypting the first encrypted part.

Optionally, the service type field is a second encrypted part of the ESP packet.

Optionally, the service type information includes one or more of precedence of the original packet, an identifier of an application program to which the original packet belongs, an identifier of an enterprise that sends the original packet, an identifier of a department that sends the original packet, and an identifier of a user that sends the original packet.

For details not provided herein, refer to detailed descriptions in the packet transmission method shown in FIG. 4.

In conclusion, in the packet transmission apparatus provided in some embodiments, because the ESP packet generated by the first device 301 by using the generation module 702 includes the service type field, and the service type field is used to enable the second device 302 to determine, based on the service type information, processing of the ESP packet, the second device 302 may obtain the service type information of the original packet by parsing the service type field of the ESP packet, and a target operation is further performed on the ESP packet based on a service policy and the service type information of the original packet without decrypting the first encrypted part. This reduces a decryption calculation workload in a process of determining a service type of the original packet by the second device 302, and further reduces calculation overheads of the second device 302.

Figure 8:
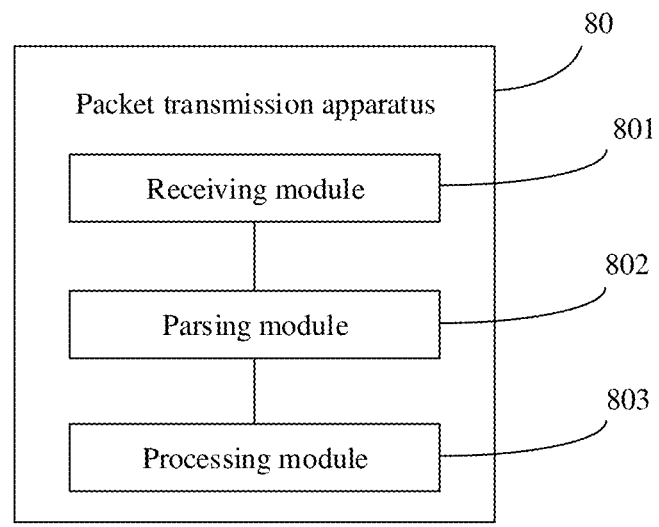
FIG. 8 is a schematic diagram of a structure of another packet transmission apparatus according to an embodiment.

FIG. 8 is a schematic diagram of a structure of another packet transmission apparatus according to an embodiment. The apparatus may be applied to the second device 302 in the communications network shown in FIG. 3. As shown in FIG. 8, the apparatus 80 includes:
- a receiving module 801, configured to receive an ESP packet sent by a first device 301, where the ESP packet includes a packet header, an ESP header, a service type field, a first encrypted part, and an ESP authentication data field, the first encrypted part includes a data part of an original packet, and the service type field includes service type information of the original packet;
- a parsing module 802, configured to parse the service type field to obtain the service type information of the original packet; and
- a processing module 803, configured to perform a target operation on the ESP packet based on a service policy and the service type information of the original packet.

Optionally, the target operation includes any one of the following: decrypting the first encrypted part of the ESP packet, discarding the ESP packet, buffering the ESP packet, and forwarding the ESP packet.

Optionally, the ESP packet further includes a block identifier field. The block identifier field is located between the packet header and the ESP header, and the block identifier field is used to indicate that the ESP packet includes the service type field.

Optionally, the block identifier field is further used to indicate to obtain the service type field before decrypting the first encrypted part.

Optionally, configuration of a target security association indicates to obtain the service type field before decrypting the first encrypted part.

Figure 9:
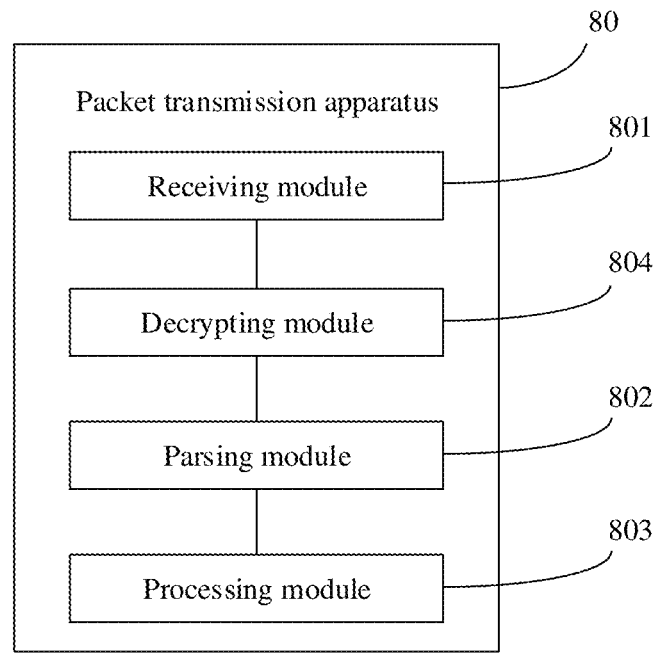
FIG. 9 is a schematic diagram of a structure of still another packet transmission apparatus according to an embodiment.

Optionally, the service type field is a second encrypted part of the ESP packet. As shown in FIG. 9, the apparatus 80 further includes:

a decrypting module 804, configured to decrypt the service type field based on an encryption algorithm configured in the target security association.

For details not provided herein, refer to detailed descriptions in the packet transmission method shown in FIG. 4.

In conclusion, in the packet transmission apparatus provided in some embodiments, because the ESP packet includes the service type field, the second device 302 may obtain the service type information of the original packet by parsing the service type field of the ESP packet by using the parsing module 802, and further performs the target operation on the ESP packet by using the processing module 803 based on the service policy and the service type information of the original packet. The first encrypted part does not need to be decrypted, which reduces a decryption calculation workload in a process where the second device 302 determines a service type of the original packet, and further reduces calculation overheads of the second device 302.

For the apparatus in the foregoing embodiment, a manner of executing an operation by each module is described in detail in a related method embodiment, and details are not described herein.

Figure 10:
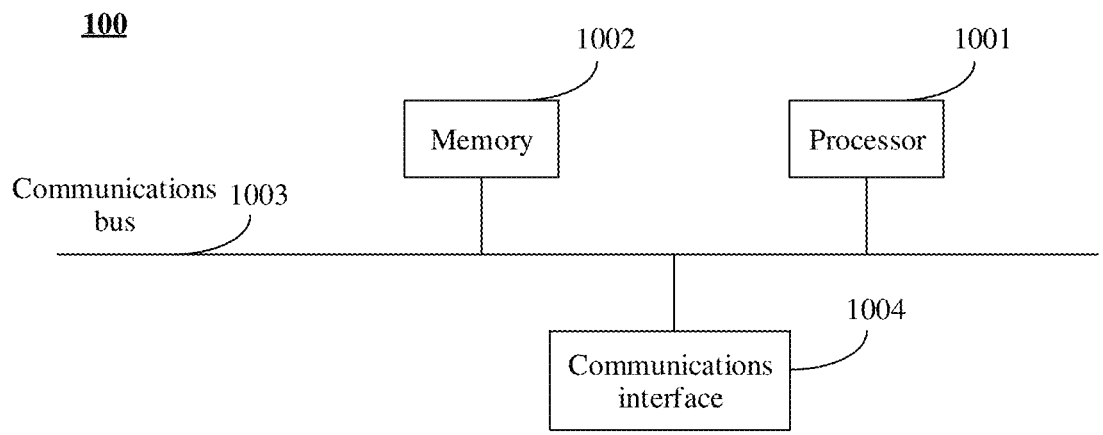
FIG. 10 is a block diagram of a packet transmission apparatus according to an embodiment.

FIG. 10 is a block diagram of a packet transmission apparatus according to an embodiment. The packet transmission apparatus may be a router, a switch, or the like. As shown in FIG. 10, the apparatus 100 includes a processor 1001 and a memory 1002.

The memory 1002 is configured to store a computer program, where the computer program includes program instructions.

The processor 1001 is configured to invoke the computer program to implement steps performed by the first device 301 and/or the second device 302 in the packet transmission method shown in FIG. 4.

Optionally, the apparatus 100 may further include a communications bus 1003 and a communications interface 1004.

The processor 1001 may be a central processing unit (CPU). The processor 1001 includes one or more processing cores, and the processor 1001 executes various functional applications and data processing by running the computer program. The processor 1001 and the memory 1002 are connected by the communications bus 1003.

The processor 1001 may further include a hardware chip. The hardware chip may be an application specific integrated circuit (ASIC), a programmable logic device (PLD), or a combination thereof. The PLD may be a complex programmable logic device (CPLD), a field-programmable gate array (FPGA), generic array logic (GAL), or any combination thereof. Optionally, the hardware chip may be configured to implement an encryption/decryption operation.

The memory 1002 may be configured to store the computer program. Optionally, the memory may store an operating system and an application program unit that is required by at least one function. The operating system may be an operating system such as a real time operating system (RTX), LINUX, UNIX, WINDOWS, or OS X.

The memory 1002 may include a volatile memory, for example, a random access memory (RAM). Alternatively, the memory may include a non-volatile memory, for example, a flash memory, a hard disk drive (HDD), or a solid-state drive (SSD). The memory 1002 may further include a combination of the foregoing types of memories.

There may be a plurality of communications interfaces 1004 that may be configured to communicate with another device. The communications interface 1004 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, a combination thereof, or the like.

An embodiment further provides a computer storage medium. The computer storage medium stores program instructions. When the program instructions are executed, steps performed by the first device 301 and/or steps performed by the second device 302 in the packet transmission method shown in FIG. 4 are implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

In the embodiments, the terms "first", "second", and "third" are merely used for a purpose of description and shall not be understood as an indication or implication of relative importance. Unless otherwise explicitly limited, the term "at least one" refers to one or more, and the term "a plurality of" refers to two or more.

The term "and/or" describes only an association relationship for describing associated objects and represents three relationships that may exist. For example, A and/or B may represent the following three cases: Only A exists, both A and B exist, and only B exists. In addition, the character "/" generally indicates an "or" relationship between the associated objects.

The foregoing descriptions are merely optional embodiments but are not intended as limiting. Any modification, equivalent replacement, improvement, or the like made without departing from the concept and principle should fall within the scope of the embodiments.

What is claimed is:

1. A packet transmission method applied to a communications network, wherein the communications network comprises a first device and a second device, a target security association is established between the first device and the second device, the first device is an initiator of the target security association, and the second device is a destination of the target security association, the packet transmission method comprising:

obtaining, by the first device, service type information of an original packet, wherein the service type information comprises precedence of the original packet;

generating, by the first device, an encapsulating security payload (ESP) packet of the original packet based on the target security association, wherein the ESP packet comprises a packet header, an ESP header, a service type field, a first encrypted part, and an ESP authentication data field, the service type field comprises the service type information, the first encrypted part comprises a data part of the original packet, and the service type field is used to enable the second device to determine, based on the service type information, processing of the ESP packet; and sending, by the first device, the ESP packet to the second device.

2. The packet transmission method according to claim 1, wherein the ESP packet further comprises a block identifier field located between the packet header and the ESP header, that is used to indicate that the ESP packet comprises the service type field.

3. The packet transmission method according to claim 2, wherein the block identifier field is further used to obtain the service type field before decrypting the first encrypted part.

4. The packet transmission method according to claim 1, wherein configuration of the target security association obtains the service type field before decrypting the first encrypted part.

5. The packet transmission method according to claim 1, wherein the service type field is a second encrypted part of the ESP packet.

6. The packet transmission method according to claim 1, wherein the service type information comprises one or more of an identifier of an application program to which the original packet belongs, an identifier of an enterprise that sends the original packet, an identifier of a department that sends the original packet, and an identifier of a user that sends the original packet.

7. A packet transmission method applied to a communications network, wherein the communications network comprises a first device and a second device, a target security association is established between the first device and the second device, the first device is an initiator of the target security association, and the second device is a destination of the target security association, the packet transmission method comprising:
receiving, by the second device, an encapsulating security payload (ESP) packet sent by the first device, wherein the ESP packet comprises a packet header, an ESP header, a service type field, a first encrypted part, and an ESP authentication data field, the first encrypted part comprises a data part of an original packet, the service type field comprises service type information of the original packet, and the service type information comprises precedence of the original packet;
parsing, by the second device, the service type field to obtain the service type information of the original packet; and
performing, by the second device, a target operation on the ESP packet based on a service policy and the service type information of the original packet.

8. The packet transmission method according to claim 7, wherein the target operation comprises any one of the following:
decrypting the first encrypted part of the ESP packet, discarding the ESP packet, buffering the ESP packet, and forwarding the ESP packet.

9. The packet transmission method according to claim 7, wherein the ESP packet further comprises a block identifier field, the block identifier field is located between the packet header and the ESP header, and the block identifier field is used to indicate that the ESP packet comprises the service type field.

10. The packet transmission method according to claim 9, wherein the block identifier field is further used to indicate to obtain the service type field before decrypting the first encrypted part.

11. The packet transmission method according to claim 7, wherein configuration of the target security association indicates to obtain the service type field before decrypting the first encrypted part.

12. The packet transmission method according to claim 7, wherein the service type field is a second encrypted part of the ESP packet, and before the parsing, by the second device, the service type field, the packet transmission method further comprising:
decrypting, by the second device, the service type field based on an encryption algorithm configured in the target security association.

13. A packet transmission apparatus comprising:
a memory configured to store a computer program; and
a processor that is configured to invoke the computer program to cause the packet transmission apparatus to:
obtain service type information of an original packet, wherein the service type information comprises precedence of the original packet;
generate an encapsulating security payload (ESP) packet of the original packet based on the target security association, wherein the ESP packet comprises a packet header, an ESP header, a service type field, a first encrypted part, and an ESP authentication data field, the service type field comprises the service type information, the first encrypted part comprises a data part of the original packet, and the service type field is used to enable the second device to determine, based on the service type information, processing of the ESP packet; and
send the ESP packet to the second device.

14. The packet transmission apparatus according to claim 13, wherein the ESP packet further comprises a block identifier field, the block identifier field is located between the packet header and the ESP header, and the block identifier field is used to indicate that the ESP packet comprises the service type field.

15. The packet transmission apparatus according to claim 14, wherein the block identifier field is further used to indicate to obtain the service type field before decrypting the first encrypted part.

16. The packet transmission apparatus according to claim 13, wherein configuration of the target security association indicates to obtain the service type field before decrypting the first encrypted part.

17. A packet transmission apparatus comprising:
a memory configured to store a computer program; and
a processor that is configured to invoke the computer program to cause the packet transmission apparatus to:
receive an encapsulating security payload (ESP) packet sent by the first device, wherein the ESP packet comprises a packet header, an ESP header, a service type field, a first encrypted part, and an ESP authentication data field, the first encrypted part comprises a data part of an original packet, the service type field comprises service type information of the original packet, and the service type information comprises precedence of the original packet;
parse the service type field to obtain the service type information of the original packet; and
perform a target operation on the ESP packet based on a service policy and the service type information of the original packet.

18. The packet transmission apparatus according to claim 17, further configured to decrypt the first encrypted part of the ESP packet, discarding the ESP packet, buffering the ESP packet, and forwarding the ESP packet.

19. The packet transmission apparatus according to claim 17, wherein the ESP packet further comprises a block identifier field, the block identifier field is located between the packet header and the ESP header, and the block identifier field is used to indicate that the ESP packet comprises the service type field.

20. The packet transmission apparatus according to claim 19, wherein configuration of the target security association or the block identifier field is used to indicate to obtain the service type field before decrypting the first encrypted part.

* * * * *